(12) United States Patent
Taniyama et al.

(10) Patent No.: US 11,237,385 B2
(45) Date of Patent: Feb. 1, 2022

(54) OPTICAL WRITING DEVICE AND IMAGE FORMING APPARATUS

(71) Applicant: Konica Minolta, Inc., Tokyo (JP)

(72) Inventors: Akira Taniyama, Hino (JP); Masahiko Takahashi, Hino (JP); Naoki Tajima, Hachioji (JP); Takashi Kurosawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 128 days.

(21) Appl. No.: 16/833,817

(22) Filed: Mar. 30, 2020

(65) Prior Publication Data
US 2020/0326533 A1   Oct. 15, 2020

(30) Foreign Application Priority Data
Apr. 10, 2019   (JP) .............................. JP2019-074485

(51) Int. Cl.
| H04N 1/00 | (2006.01) |
| G02B 26/10 | (2006.01) |
| H04N 1/21 | (2006.01) |
| H04N 1/10 | (2006.01) |

(52) U.S. Cl.
CPC ......... *G02B 26/10* (2013.01); *H04N 1/00018* (2013.01); *H04N 1/0027* (2013.01); *H04N 1/00549* (2013.01); *H04N 1/00557* (2013.01); *H04N 1/10* (2013.01); *H04N 1/2129* (2013.01); *H04N 2201/0428* (2013.01)

(58) Field of Classification Search
CPC .......... H04N 1/00549; H04N 1/00557; H04N 2201/0428
USPC ......................................................... 358/474
See application file for complete search history.

(56) References Cited

U.S. PATENT DOCUMENTS 9,975,350 B2 * 5/2018 Ishidate ............... G03G 15/043

FOREIGN PATENT DOCUMENTS

| JP | H09-159955 A | 6/1997 |
| JP | H10-115794 A | 5/1998 |
| JP | 2001-228425 A | 8/2001 |
| JP | 2018-066927 A | 4/2018 |

* cited by examiner

*Primary Examiner* — Kent Yip
(74) *Attorney, Agent, or Firm* — Lucas & Mercanti, LLP

(57) ABSTRACT

An optical writing device performs writing by scanning an image surface of a photoconductor with light, and includes a light source unit including a light source that emits light, a deflection unit that deflects and scans the light, an optical element unit for the light, and a housing unit that holds the light source unit, the deflection unit, and the optical element unit. The housing unit includes a vibration isolator that isolates vibration transmitted from a vibration antinode where distribution of vibration in a sub direction perpendicular to a scanning direction of the light on the image surface of the photoconductor is maximum to at least one of seat face parts for the light source unit and the optical element unit having optical sensitivity in the sub direction, in a bottom face part of the housing unit, and a rigidity enhancer that increases rigidity of the seat face part.

13 Claims, 11 Drawing Sheets

OPTICAL WRITING DEVICE AND IMAGE FORMING APPARATUS

CROSS-REFERENCE TO RELATED APPLICATIONS

The entire disclosure of Japanese Patent Application No. 2019-074485 filed on Apr. 10, 2019 is incorporated herein by reference in its entirety.

BACKGROUND

Technological Field

The present invention relates to an optical writing device and an image forming apparatus.

Image forming apparatuses, such as printer and a multi-function peripherals (MFPs), that form an image on a recording medium using an electrophotographic system are known. A known image forming apparatus has an optical writing device using a deflection scanning system. The deflection scanning system performs scanning by deflecting a light beam from a light source, such as a semiconductor laser, using a deflector including a polygon mirror and a motor, forms an image as a light spot on an image carrier, such as a charged photoconductor (drum), using a scanning lens system, and writes an electrostatic latent image. The direction of scanning a photoconductor with light is hereinafter referred to as a main direction, and the direction perpendicular to the main direction on the photoconductor is referred to as a sub direction.

In an optical writing device that scans a photoconductor with light using a deflector, a housing (referred to also as a casing and an optical box) of the optical writing device vibrates with a specific vibration distribution (the vibration mode and the manner of vibration) due to vibration from the deflector. FIG. 15 is a schematic side view illustrating a related-art optic writing device.

As illustrated in FIG. 15, in the case where a housing H4 of the optical writing device has a seat face part S40 for an optical element part O4 including a light source, an optical element, and a holding member therefor, in the vicinity of a portion where the vibration distribution of a deflector P4 is maximum, the light source and the optical element of the optical element part O4 vibrate. When the light source and the optical element vibrate, the imaging position on a photoconductor is vibrated and displaced due to the optical sensitivity of each of the light source and the optical element. As the vibration of the light source and the optical element becomes large, the displacement of the imaging position on the photoconductor increases, which may result in a decrease in image quality. In FIG. 15, the light beam is indicated by the while arrow. The same applies to FIG. 12 described below.

In particular, the imaging position displacement in the sub direction is likely to be visually recognized as periodic irregularities (pitch irregularities). Even an imaging position displacement of an amplitude of 1 [μm] or less in the sub direction may be recognized as pitch irregularities. There are possible solutions to prevent a reduction in image quality due to pitch irregularities. Among those, there is a known technique that reduces the vibration of an optical element seat face of a housing.

For example, there is known a deflection scanning device in which a locally hollow wall is provided near a light source unit that is sensitive to the image quality so as to increase the rigidity, thereby reducing the vibration of the light source unit (see Japanese Patent Application Publication No. 10-115794 (JP 10-115794 A)).

There is also known an optical scanning device in which a partition wall is provided between a mechanical deflector region and an optical element region so as to increase the rigidity of a housing, thereby reducing vibration (see Japanese Patent Application Publication No. 2001-228425 (JP 2001-228425 A)).

There is also known an image forming apparatus in which a plurality of housings are fastened with a vibration-proof member and a polygon mirror and an optical element are mounted in the different housings, thereby reducing transmission of vibration from a deflector to the optical element (see Japanese Patent Application Publication No. 9-159955 (JP 9-159955 A)).

There is also known a light beam scanning device in which an arcuate C-shaped through-hole surrounding a seat face part for a scanning lens serving as an optical element is provided on the side of a polygon motor serving as an excitation source of the seat face part (see Japanese Patent Application Publication No. 2018-66927 (JP 2018-66927 A)). However, this through-hole is provided as a measure against heat so as to prevent transfer of the heat of the polygon motor to the optical element.

SUMMARY

According to the configurations of JP 10-115794 A and JP 2001-228425 A, no vibration isolator is provided in the vicinity of a long opening through which the light passes. Therefore, vibration may be transmitted from the portion in the vicinity of the opening where vibration is large to the optical element seat face. According to the configuration of JP 9-159955 A, the polygon mirror and the optical element are mounted in the different housings. This may increase the cost and assembly time, and may make it difficult to secure the accuracy in the relative position between parts. According to the configuration of JP 2018-66927 A, vibration from the polygon motor is isolated by the through-hole. However, it may not be possible to reduce vibration due to the vibration transmitted from the vibration antinode where vibration is large.

An object of the present invention is to easily and effectively prevent a reduction in image quality due to pitch irregularities.

To achieve at least one of the abovementioned objects, according to an aspect of the present invention, an optical writing device of the present invention performs writing by scanning an image surface of a photoconductor with light, the optical writing device including:

a light source unit including a light source that emits light;
a deflection unit that deflects and scans the light;
an optical element unit for the light; and
a housing unit that holds the light source unit, the deflection unit, and the optical element unit;

wherein the housing unit includes a vibration isolator that isolates vibration transmitted from a vibration antinode where distribution of vibration in a sub direction perpendicular to a scanning direction of the light on the image surface of the photoconductor is maximum to at least one of seat face parts for the light source unit and the optical element unit having optical sensitivity in the sub direction, in a bottom face part of the housing unit, and a rigidity enhancer that increases rigidity of the seat face part.

According to another aspect of the present invention, an image forming apparatus of the prevent invention includes:

an image forming unit that includes the optical writing device and the photoconductor of the present invention, and that forms an image corresponding to light emitted to the photoconductor, on a sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein.

DETAILED DESCRIPTION OF THE EMBODIMENTS

Figure 1:
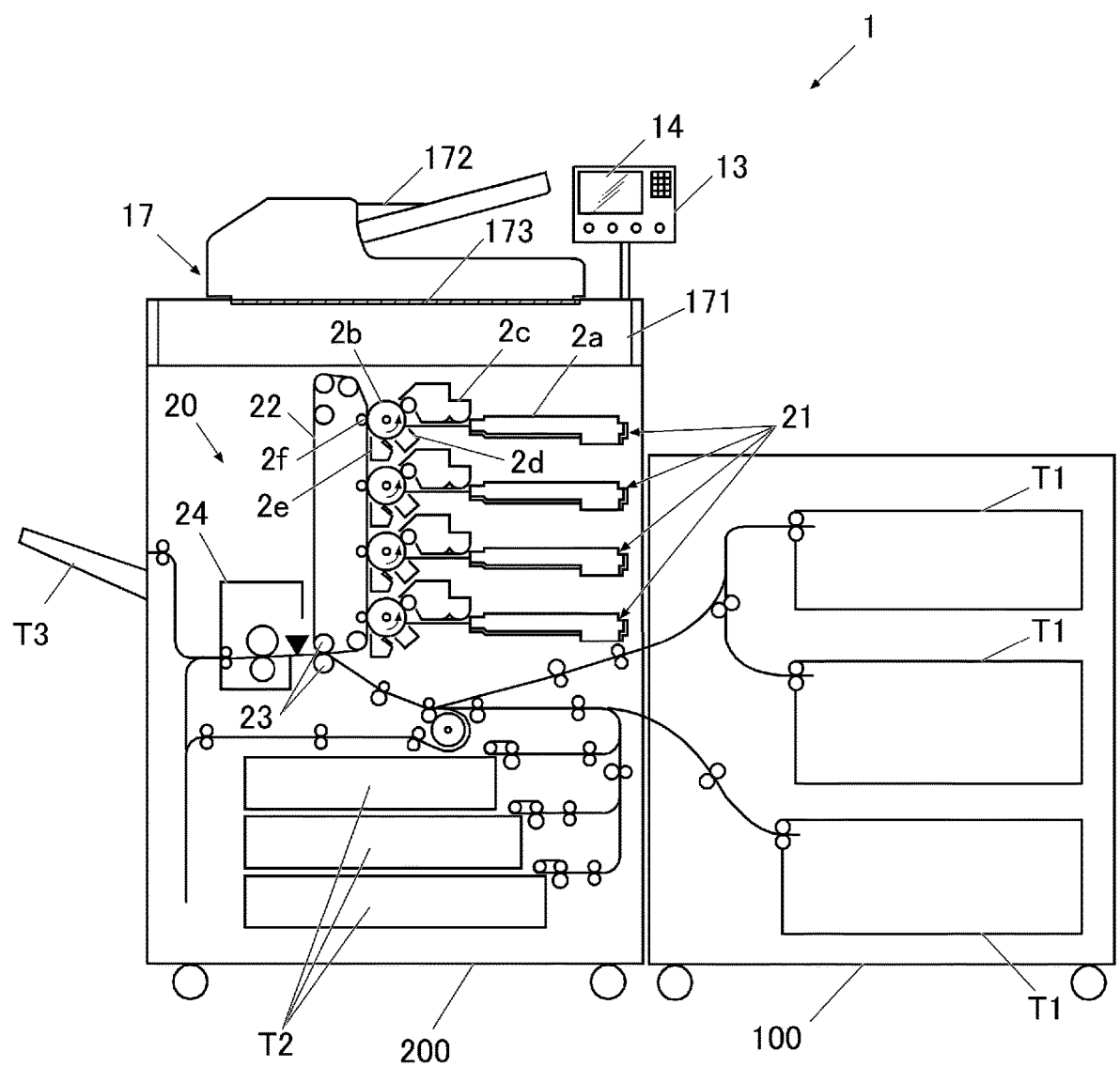
FIG. 1 illustrates the schematic configuration of an image forming apparatus according to an embodiment of the present invention.

An embodiment and first and second modifications according to the present invention will be described one by one with reference to the accompanying drawings. However, the present invention is not limited to the examples illustrated in the drawings.

Embodiment

An embodiment of the present invention will be described with reference to FIGS. 1 to 12. First, the overall device configuration according to the present embodiment will be described with reference to FIGS. 1 and 2. FIG. 1 illustrates the schematic configuration of an image forming apparatus 1 according to the present embodiment.

Figure 2:
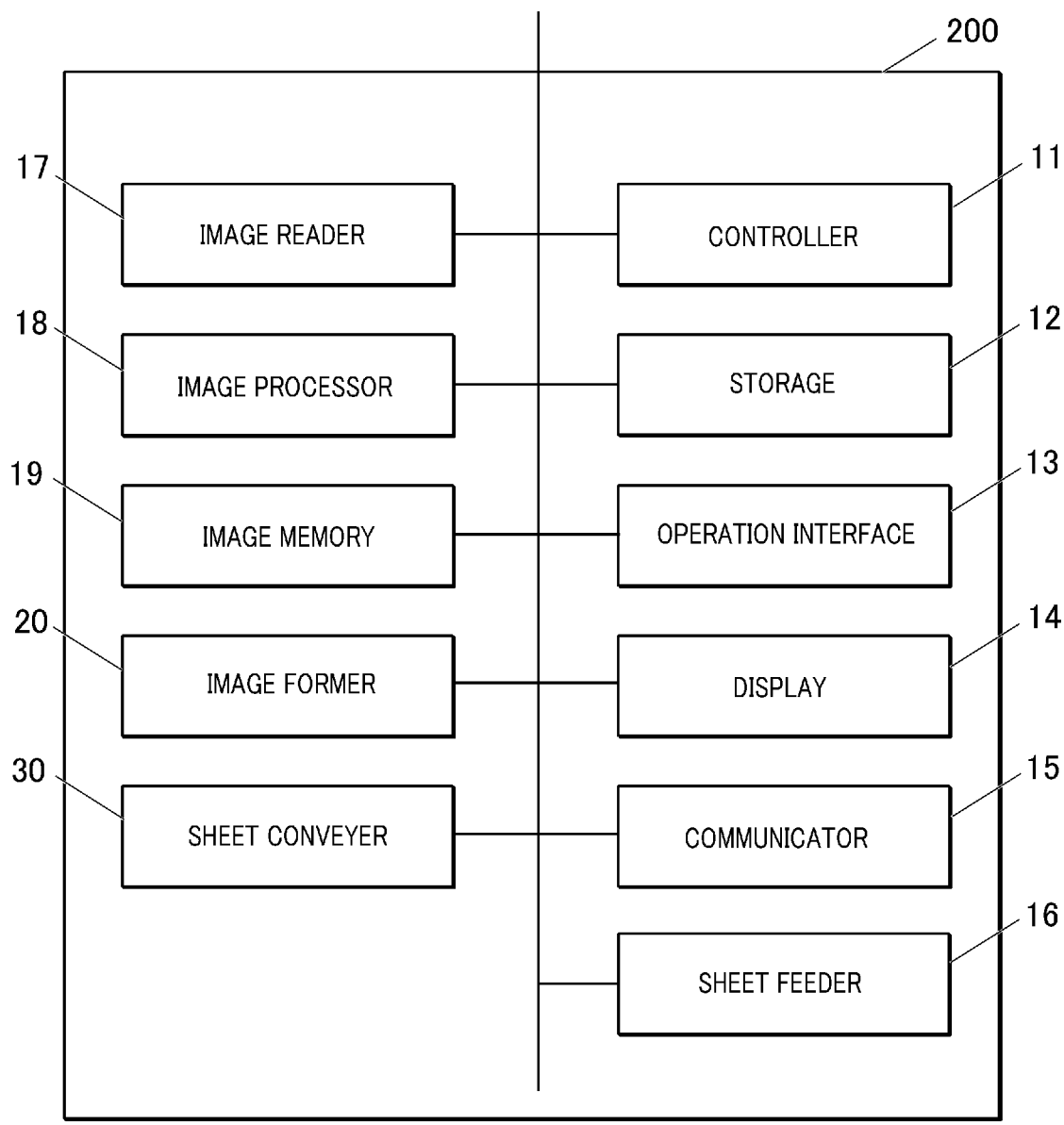
FIG. 2 is a block diagram illustrating the functional configuration of a main body unit.

FIG. 2 is a block diagram illustrating the functional configuration of a main body unit 200.

The overall configuration of the image forming apparatus 1 according to the present invention will be described. The image forming apparatus 1 is an MFP that forms a color image using an electrophotographic system. However, the image forming apparatus 1 is not limited thereto, and may be any other type of image forming apparatus such as an MFP that forms a monochrome image and a printer. As illustrated in FIG. 1, the image forming apparatus 1 includes a sheet feeding unit 100, and the main body unit 200.

The sheet feeding unit 100 includes a plurality of large-capacity sheet feeding trays T1 that store, for example, sheets of various sizes and types. The sheet feeding unit 100 picks up a sheet of the type specified by the main body unit 200 from the corresponding sheet feeding tray T1$i$, and conveys the sheet to the main body unit 200.

The main body unit 200 includes a plurality of sheet feeding trays T2, an image reader 17, and an image former 20 as an image forming unit. The main body unit 200 receives page description language (PDL) data from a personal computer (PC) serving as an external device on a communication network, and rasterizes the PDL data to generate image data in the bitmap format. The main body unit 200 also reads a document using the image reader 17 and performs image processing thereon to generate image data. The generated image data includes image data for each color of cyan (C), magenta (M), yellow (Y), and black (K).

The main body unit 200 causes the image former 20 to form and fix a toner image on a sheet fed from the sheet feeding tray T1 or the sheet feeding tray T2, based on image data generated from PDL data or image data generated by the image reader 17, and conveys the sheet subjected to fixing to a sheet discharge tray T3. Note that the image forming apparatus 1 may be configured to have a post-processing device. The post-processing device may perform post-processing, such as stapling, punching, folding, and bookbinding, on the sheet subjected to fixing, and then discharge the sheet to the sheet discharge tray T3, or may discharge the sheet as it is without performing post-processing.

In the following, the configuration of the main body unit 200 will be described. As illustrated in FIGS. 1 and 2, the main body unit 200 includes a controller 11, a storage 12, an operation interface 13, a display 14, a communicator 15, a sheet feeder 16, the image reader 17, an image processor 18, an image memory 19, the image former 20, and a sheet conveyer 30.

The controller 11 includes a central processing unit (CPU) and a random access memory (RAM). The CPU of the controller 11 reads a program stored in the storage 12, loads the program to the RAM, and controls the components of the image forming apparatus 1 according to the loaded program. For example, the controller 11 causes the image processor 18 to perform image processing on image data of a job, causes the sheet feeding unit 100 or the sheet feeder 16 to feed a sheet, and causes the image former 20 to form and fix an image on the sheet, according to the settings for the job received from an external device via the communicator 15.

The storage 12 stores programs and files readable by the controller 11. The storage 12 may be, for example, a non-volatile readable and writable storage medium such as a hard disc and a flash memory. In particular, the storage 12 stores an image forming program for performing image forming processing described below.

The operation interface 13 includes operation keys, and a touch panel integrally formed with the display 14, and outputs an operation signal corresponding to a user input thereon to the controller 11. The user can enter the settings for a job, the settings for processing, and instructions for a change, and so on, via the operation interface 13.

The display 14 includes a liquid crystal display, and displays display information such as an operation screen according to an instruction of the controller 11. The communicator 15 includes a network card, and is connected to a communication network such as a local area network (LAN) so as to transmit information to and receive information from an external device on the communication network. The controller 11 communicates with the external device on the communication network via the communicator 15.

The sheet feeder 16 includes the plurality of sheet feeding trays T2 that store, for example, sheets of various sizes of types. The sheet feeder 16 picks up a sheet of a specified type from the corresponding sheet feeding tray T2, and conveys the sheet to the image former 20, according to an instruction of the controller 11.

The image reader 17 includes an automatic document conveyer, a scanner 171, a placement tray 172, and a platen glass 173. The automatic document conveyer includes the placement tray 172 on which a document is placed, a mechanism for conveying the document, and a conveyance roller. Under the control of the controller 11, the automatic document conveyer conveys the document to a predetermined conveyance path. The scanner 171 includes an optical system, such as a light source and a reflecting mirror, and an imaging element. The scanner 171 reads an image of a document conveyed through the predetermined conveyance path or a document placed on the platen glass 173, generates image data in the bitmap format for each color of read (R), green (G), and blue (B), and outputs the image data to the image processor 18.

The controller 11 rasterizes the PDL data received from the communicator 15 to generate image data in the bitmap format. Further, if the generated image data in the bitmap format via the communicator 15 or the image reader 17 has pixel values of three colors of red (R), green (G), and blue (B), the controller 11 converts the image data into image data having pixel values of four colors of C, M, Y, and K, and then holds the image data in the image memory 19.

The image memory 19 is a buffer memory that temporarily holds the image data generated by the image processor 18. The image memory 19 may be a dynamic RAM (DRAM).

The image processor 18 reads the image data from the image memory 19, and performs various types of image processing, such as gray level correction and halftone processing. The gray level correction is processing for converting each pixel value of image data such that the gray level of the image on a sheet matches the target gray level. The halftone processing is processing, such as dither processing and error diffusion processing, for reproducing halftones in a pseudo manner.

The image former 20 forms and fixes an image of four colors of C, M, Y, and K on a sheet, according to the pixel values of the four colors of each pixel of the image data subjected to image processing by the image processor 18. As illustrated in FIG. 1, the image former 20 includes four writing units 21, an intermediate transfer belt 22, secondary transfer rollers 23, and a fixer 24.

The four writing units 21 are disposed in tandem along the belt surface of the intermediate transfer belt 22, for the four individual colors of C, M, Y, and K. The four writing units 21 form color images of C, M, Y, and K. Each of the writing units 21 includes an exposer 2a as an optical writing device, a photoconductor 2b, a developer 2c, a charger 2d, a cleaner 2e, and a primary transfer roller 2f.

The photoconductor 2b is a rotating conductive cylindrical body. The charger 2d charges the photoconductor 2b. The exposer 2a includes a semiconductor laser light source. Under the control of the controller 11, the exposer 2a drives the semiconductor laser light source according to image data, and scans and irradiates the photoconductor 2b charged by the charger 2d with laser light so as to expose the photoconductor 2b. Under the control of the controller 11, the developer 2c supplies toner onto the photoconductor 2b using the charged developing roller, and develops an electrostatic latent image formed on the photoconductor 2b by exposure. Then, the images formed on the respective photoconductors 2b of the four writing units 21 are sequentially transferred (primary-transferred) in a superimposed manner onto the intermediate transfer belt 22 by the respective primary transfer rollers 2f. In this way, a color toner image of the individual colors is formed on the intermediate transfer belt 22. After the primary transfer, the cleaner 2e removes the toner remaining on the photoconductor 2b.

The intermediate transfer belt 22 is an endless belt extending around a plurality of rollers, and rotates in accordance with rotations of the rollers under the control of the controller 11. Under the control of the controller 11, the secondary transfer rollers 23 transfer (secondary-transfer) the toner image formed on the intermediate transfer belt 22 onto a sheet conveyed from the sheet feeding unit 100 (sheet feeding tray T1) or the sheet feeder 16 (sheet feeding tray T2).

The fixer 24 includes a heating roller and a pressure roller. Under the control of the controller 11, the fixer 24 applies heat and pressure to the sheet with the image formed thereon by the secondary transfer rollers 23 so as to fix the image on the sheet.

As illustrated in FIG. 2, the sheet conveyer 30 includes a registration roller and a conveyance roller for conveying a sheet. Under the control of the controller 11, the sheet conveyer 30 supplies a sheet stored in the sheet feeding tray T1 of the sheet feeding unit 100 or the sheet feeding tray T2 of the sheet feeder 16 to the image former 20, and discharges the sheet subjected to fixing by the fixer 24 to the sheet discharge tray T3. Further, the sheet conveyer 30 includes a flipper serving as a path for flipping a sheet. When performing duplex printing, the sheet conveyer 30 flips the sheet with an image formed on its surface at the flipper, and supplies the sheet again to the image former 20, under the control of the controller 11.

Figure 3A:
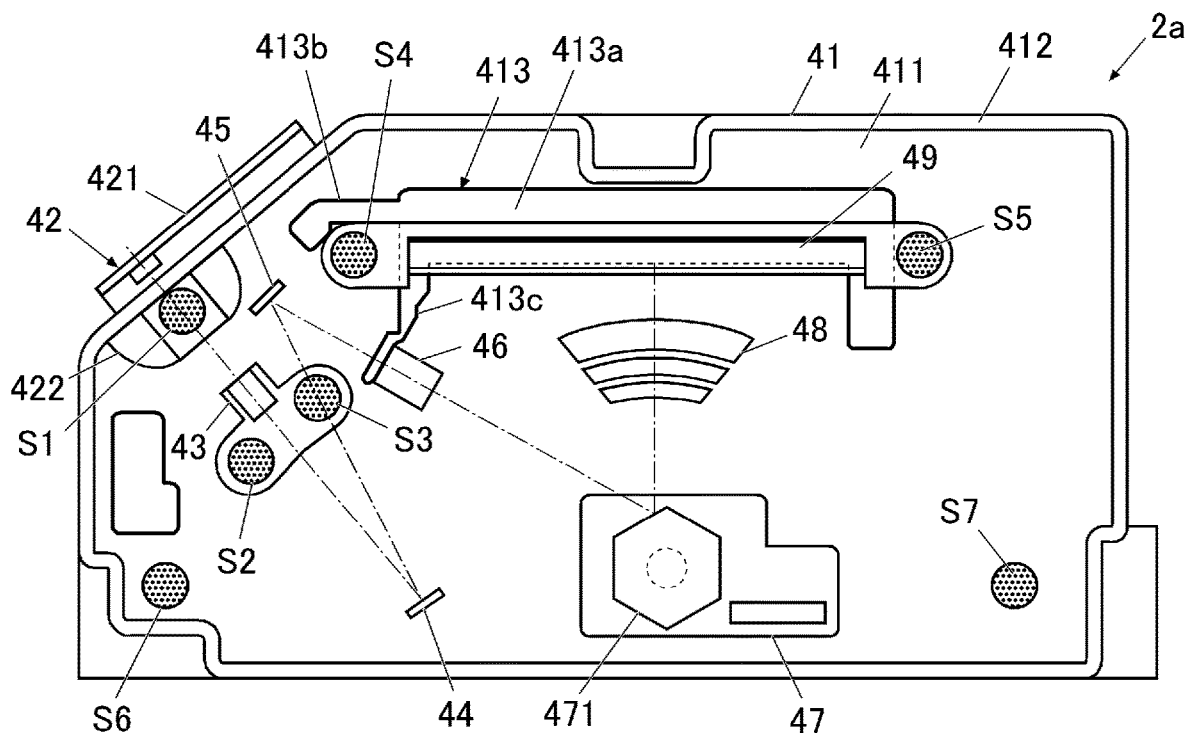
FIG. 3A is a schematic transparent top view of an exposer.
Figure 3B:
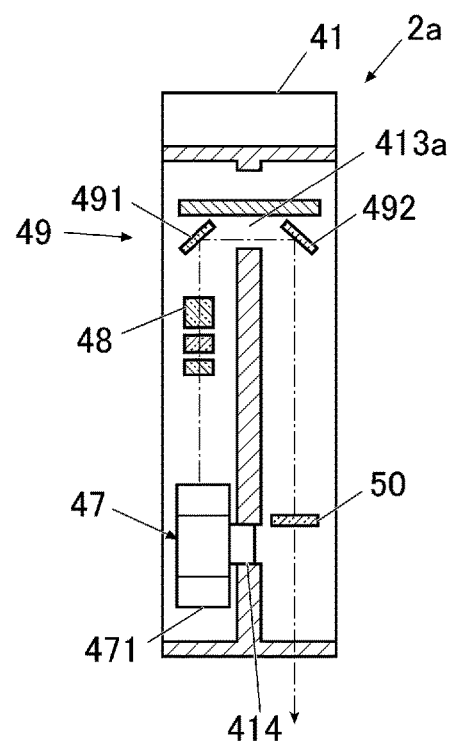
FIG. 3B is a schematic transparent side view of the exposer.
Figure 4:
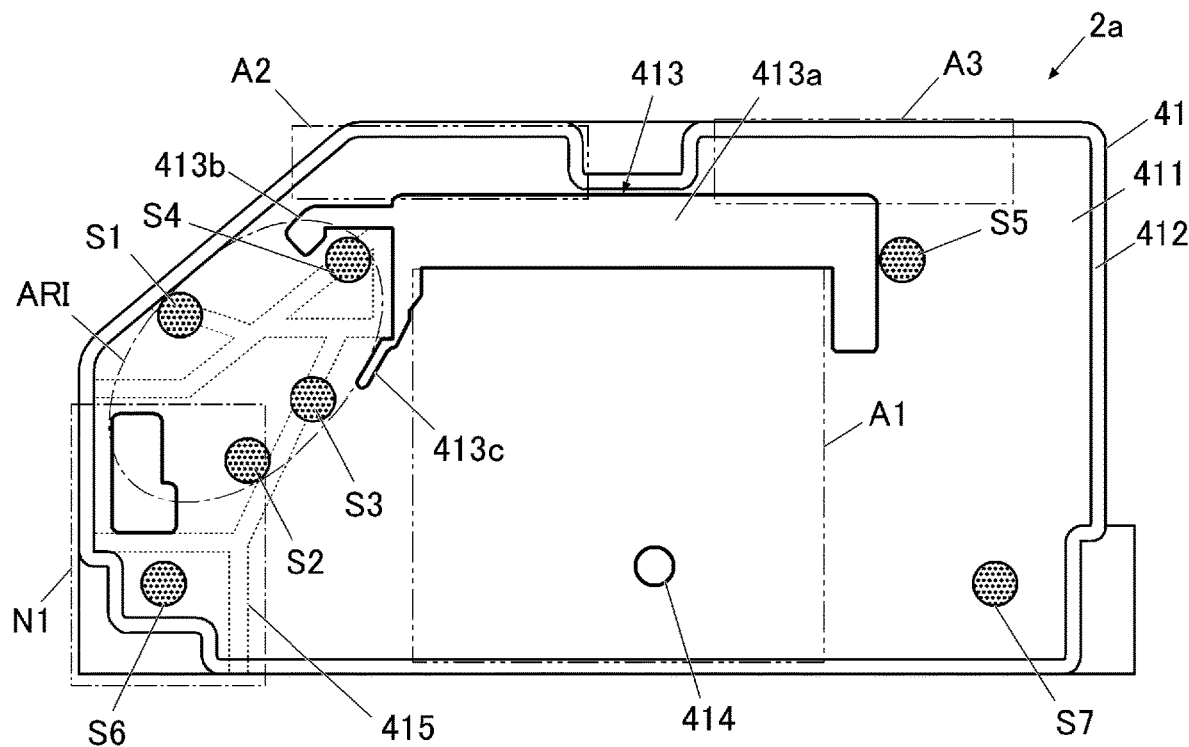
FIG. 4 is a schematic plan view of a housing of the exposer.

In the following, the device configuration of the exposer 2a of the image former 20 will be described with reference to FIGS. 3A to 8B. FIG. 3A is a schematic transparent top view of the exposer 2a. FIG. 3B is a schematic transparent side view of the exposer 2a. FIG. 4 is a schematic plan view of a housing 41 of the exposer 2a.

As illustrated in FIGS. 3A and 3B, the exposer 2a includes the housing 41 as a housing unit. In FIGS. 3A and 3B, the trajectory of the light beam is indicated by the one-dot chain arrow. The housing 41 includes a bottom face part 411 and a wall 412. The housing 41 also includes a cover member (not illustrated) that covers the open areas in the front surface (upper surface) and the back surface (lower surface) of the housing 41 to prevent dust from the surrounding environment. The housing 41 is produced by, for example, aluminum die-casting (injection molding using a mold and cutting).

The bottom face part 411 is disposed to extend in a plane parallel to the scanning direction (main direction) of the light of a below-described folding mirror unit 49. The wall 412 is disposed to extend in the sub direction perpendicular to the main direction from the outer edge (periphery) of the bottom face part 411. As illustrated in FIG. 3B, the bottom face part 411 is disposed at the substantially middle position of the housing 41 in the sub direction.

The bottom face part 411 has holes such as an opening 413 and a hole 414 (FIG. 4). The opening 413 includes a long opening 413a and notches 413b and 413c, as a vibration isolator and a first notch. The long opening 413a is a substantially rectangular through-hole extending in the main direction. The notch 413b is a through-hole extending leftward from the left end of the long opening 413a in FIG. 4. The notch 413c is a through-hole extending toward the lower left from the left end of the long opening 413a in FIG. 4.

The exposer 2a includes, on the front surface of the bottom face part 411, a light source part 42 as a light source unit; a collimator lens unit 43, mirror units 44 and 45, and a cylindrical lens unit 46 as an optical element unit; a deflector 47; and a long lens unit 48 and the folding mirror unit 49 as the optical element unit. The exposer 2a includes, on the back surface of the bottom face part 411, a long lens unit 50 as the optical element unit.

The light source part 42 is an emitter of a light beam, and includes a substrate 421 and a light source block 422. The substrate 421 is an electronic substrate disposed outside the housing 41, on which a laser diode (LD) as a semiconductor laser light source is mounted. The light source block 422 includes a holding member for the substrate 421 disposed inside the housing 41, and is fixed and connected to the front surface of the bottom face part 411. A fixing connection part for the light source part 42 on the bottom face part 411 is a seat face part S1.

The collimator lens unit 43 is an optical element part that converts a light beam emitted from the light source part 42 into parallel light, and includes a collimator lens as an optical element that converts the incident light into parallel light, and a lens holder therefor. The collimator lens unit 43 is fixed and connected to the front surface of the bottom face part 411. A fixing connection part for the collimator lens unit 43 on the bottom face part 411 includes seat face parts S2 and S3.

The mirror unit 44 is an optical element part that reflects the light beam emitted from the collimator lens unit 43, and includes a mirror as an optical element. The mirror unit 44 is fixed to the upper surface of the bottom face part 411. The mirror unit 45 is an optical element part that reflects the light beam reflected by the mirror unit 44, and includes a mirror as an optical element. The mirror unit 45 is fixed to the front surface of the bottom face part 411.

The cylindrical lens unit 46 is an optical element part that focuses the light beam reflected by the mirror unit 45 in the sub direction, and includes a cylindrical lens as an optical element that focuses the incident light in the sub direction, and a lens holder therefor. The cylindrical lens unit 46 is fixed and connected to the front surface of the bottom face part 411. The collimator lens unit 43 and the cylindrical lens unit 46 serve as a light source optical system that shapes the light from the light source and guides the light to the deflector 47.

The deflector 47 is a mirror that reflects and scans the light emitted from the light source part 42 in the main direction, and includes a polygon mirror 471, a motor, and a drive substrate. The deflector 47 is fixed and connected to the front surface of the bottom face part 411. The polygon mirror 471 is formed in the shape of a regular polygonal prism (e.g., hexagonal prism) with mirrors on its sides, and is rotationally driven at high speed by the electromagnetic force of a motor driven by the drive substrate.

The long lens unit 48 includes a plurality of (e.g., three) long lenses as optical elements, and a lens holder therefor, and is fixed and connected to the front surface of the bottom face part 411. The folding mirror unit 49 is an optical element part that folds and reflects the light beam emitted from the long lens unit 48 to the lower surface side of the bottom face part 411, and includes folding mirrors 491 and 492, and a holding member therefor. The folding mirror unit 49 is fixed and connected to the front surface of the bottom face part 411. A fixing connection part for the folding mirror unit 49 on the bottom face part 411 includes seat face parts S4 and S5.

The folding mirror 491 is an optical element that reflects the light beam emitted from the long lens unit 48 in the sub direction, and is disposed on the upper surface side of the bottom face part 411. The folding mirror 492 is an optical element that reflects the light beam reflected by the folding mirror 491 in the direction perpendicular to the main direction and the sub direction, and is disposed on the lower surface side of the bottom face part 411. The light beam reflected by the folding mirror 491 passes through the long opening 413a.

The long lens unit 50 includes a long lens as an optical element, and a lens holder therefor, and is fixed and connected to the back surface of the bottom face part 411. The imaging position of the light beam is converted by the long lens units 48 and 50 from a uniform rotary motion of the deflector 47 into a uniform linear motion on the photoconductor 2b. A fixing connection part for the long lens unit 50 on the bottom face part 411 includes seat face parts S6 and S7. The long lens unit 48, the folding mirror unit 49, and the long lens unit 50 serve as a scanning optical system that scans the light from the deflector 47 and focuses the light onto the surface of the photoconductor 2b serving as an image carrier.

The deflector 47 is an excitation part that vibrates the bottom face part 411 of the housing 41 due to the rotary motion of the motor. As illustrated in FIG. 4, the deflector 47 is disposed at the position of the hole 414 in the bottom face part 411. The bottom face part 411 has vibration antinodes A1, A2, and A3 where the distribution of vibration of the housing 41 in the sub direction at the drive frequency of the deflector 47 is maximum, under and on both sides of the opening 413. The bottom face part 411 also has a vibration node N1 where the distribution of vibration of the housing 41 in the sub direction at the drive frequency of the deflector 47 is minimal, near the lower left end. The drive frequency of the deflector 47 may be a single rotation frequency or a single scanning frequency of the motor of the polygon mirror 471. In the case where the motor is used for a deflector of an electrophotographic image forming apparatus, pitch irregularities at a single rotation frequency of the motor are easily visually recognized, and therefore a single rotation frequency of the motor is often discussed.

As illustrated in FIG. 4, the bottom face part 411 includes the seat face parts S1 to S4 for the light source part 42 and the collimator lens unit 43 as a light source part and an optical element part having optical sensitivity in the sub direction of the light beam on the imaging surface on the image surface, in a region AR1 in the vicinity of the left end of the long opening 413a of the opening 413. With this configuration, the vibration of the region AR1 is reduced. The opening 413 includes the two notches 413b and 413c extending from a portion in the vicinity of the left end of the long opening 413a. The notch 413b extends between the vibration antinode A2 and the region AR1, and there is an extended line thereof. The notch 413c extends between the vibration antinode A1 and the region AR1, and there is an extended line thereof. Accordingly, the notches 413b and 413c block transmission of vibration from the vibration antinodes A1 and A2 to the region AR1.

The housing 41 includes a rib 415 as a rigidity enhancer on the back surface of the region AR1 of the bottom face part 411. Since the rigidity of the region AR1 of the housing 41 is reduced due to the presence of the notches 413b and 413c in the bottom face part 411, vibration might not be reduced without any rigidity enhancer. Accordingly, by providing the rib 415 including a plurality of ribs extending across the region AR1, the rigidity of the region AR1 of the bottom face part 411 is increased.

The rib 415 is integrally formed with the bottom face part 411 and the wall 412 of the housing 41. Since the rib 415 is formed integrally, it is possible to reduce the cost of parts of the rigidity enhancer, to reduce the man-hours for assembly, compared to the case where the rib 415 is formed as a separate member. Therefore, it is possible to provide an optical writing device at lower costs.

Figure 5:
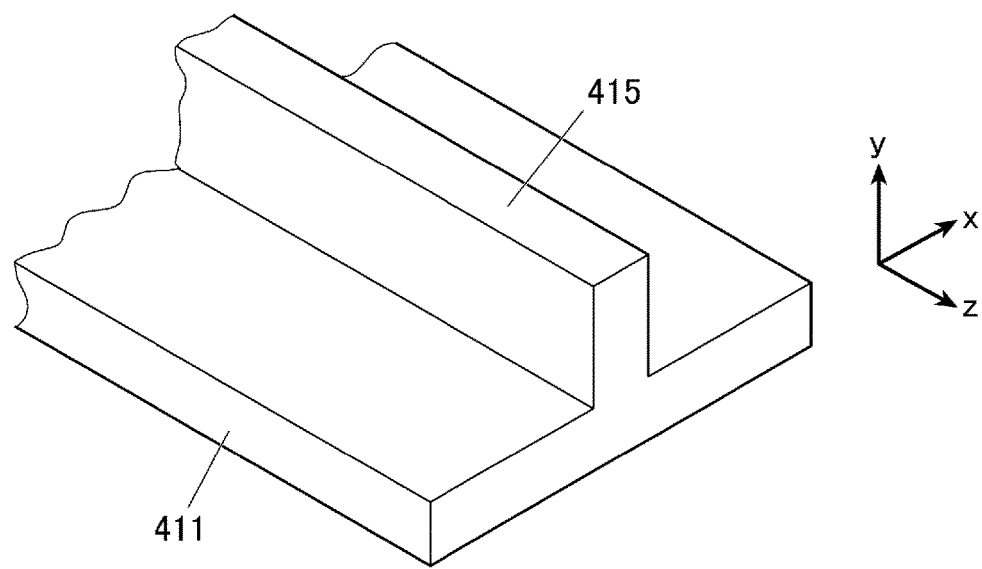
FIG. 5 is a schematic perspective view of a rib on a bottom face part.

FIG. 5 is a schematic perspective view of the rib 415 on the bottom face part 411. As illustrated in FIG. 5, an x-axis, a y-axis, and a z-axis are defined in a schematic diagram of the rib 415 on the bottom face part 411. In this case, the cross-sectional secondary moment of rotation about the x-axis can be increased.

Figure 6A:
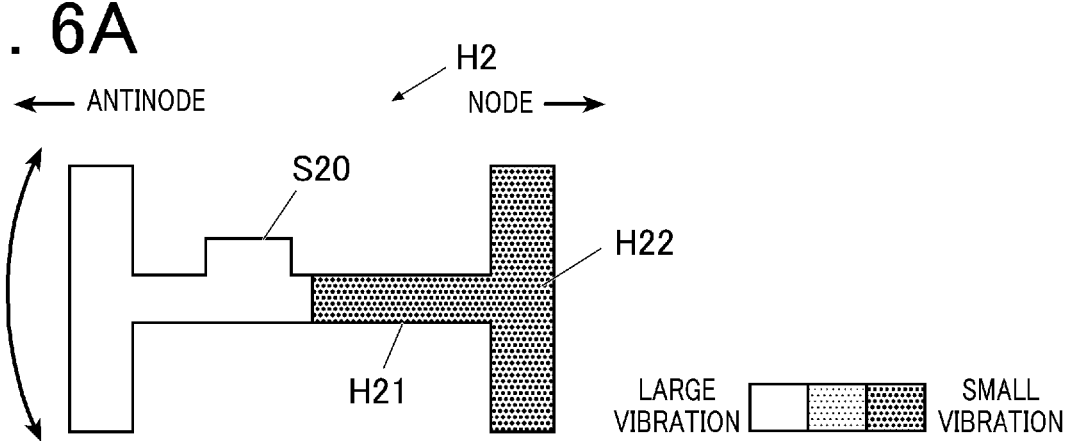
FIG. 6A is a schematic diagram of a housing according to a first comparative example.
Figure 6B:
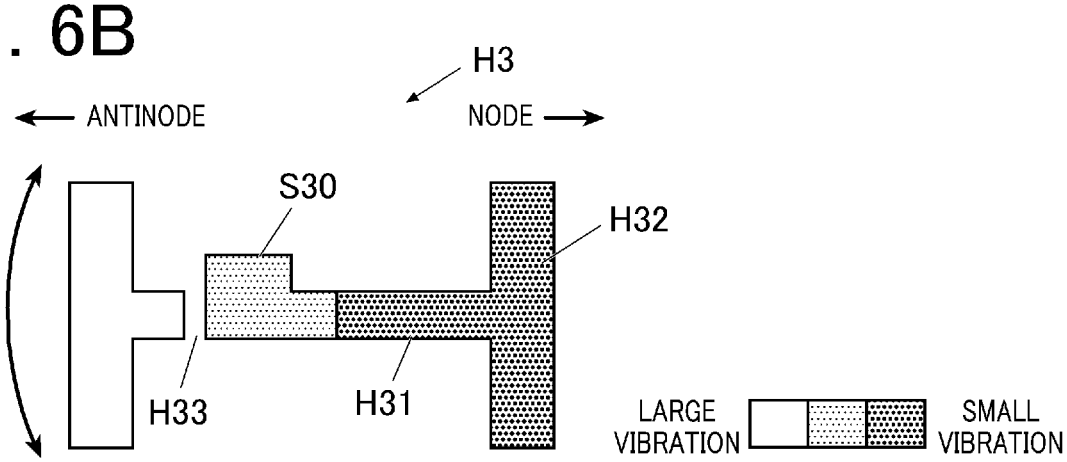
FIG. 6B is a schematic diagram of a housing according to a second comparative example.
Figure 6C:
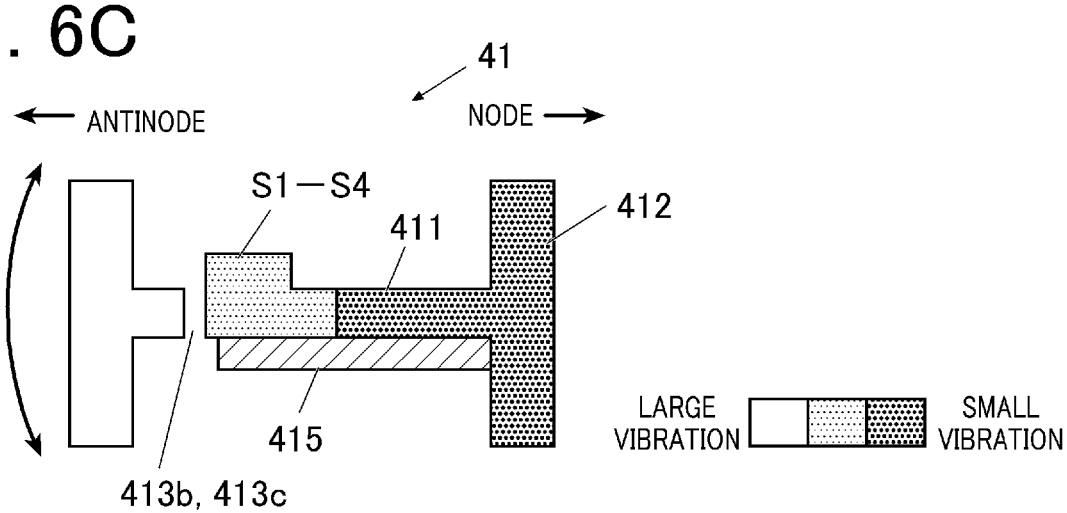
FIG. 6C is a schematic diagram of a housing according to the embodiment.

FIG. 6A is a schematic diagram of a housing H2 according to a first comparative example. FIG. 6B is a schematic diagram of a housing H3 according to a second comparative example. FIG. 6C is a schematic diagram of the housing 41 according to the present embodiment. Referring to FIG. 6A, assume the housing H2 as the first comparative example of the optical writing device. The housing H2 includes a bottom face part H21 and a wall H22. The bottom face part H21 includes a seat face part S20 for a light source part and an optical element part. A vibration antinode with large vibration is located at the left of the bottom face part H21, and a vibration node with small vibration is located at the right of the bottom face part H21. In FIGS. 6A to 6C, a portion of the housing with large vibration is indicated in white; a portion of the housing with small vibration is indicated in black; and a portion with intermediate vibration is indicated in gray. The same applies to FIGS. 10A and 10B described below.

In the housing H2, since vibration is directly transmitted from a portion with large vibration to the seat face part S20, the vibration of the seat face part S20 is also large. Referring to FIG. 6B, assume the housing H3 as the second comparative example of the optical writing device. The housing H3 includes a bottom face part H31, a wall H32, and a notch H33. The bottom face part H31 includes a seat face part S30 for a light source part and an optical element part. In the housing H3, the notch H33 is located between a left portion as a vibration antinode with large vibration and the seat face part S30. The notch H33 isolates (blocks) vibration from the portion of the housing H3 with large vibration to the portion as a vibration node with small vibration, so that the vibration of the seat face part S30 is reduced.

Referring to FIG. 6C, the housing 41 of the present embodiment includes the bottom face part 411, the wall 412, the notches 413b and 413c, and the rib 415. The bottom face part 411 includes the seat face parts S1 to S4. The notches 413b and 413c isolate vibration from the portion of the housing 41 as a vibration antinode with large vibration to the portion as a vibration node with small vibration, so that the vibration of the seat face parts S1 to S4 is reduced. Moreover, the rigidity of the seat face parts S1 to S4 and the portion with small vibration is increased due to the rib 415, so that the vibration of the seat face parts S1 to S4 is further reduced.

That is, the housing 41 includes the following configurations (1) and (2).

(1) The notches 413b and 413c block transmission of vibration from the vibration antinode of the housing 41 to the seat face parts S1 to S4.

(2) The rib 415 is attached to a portion (region AR1) in the vicinity of the seat face parts S1 to S4 to reduce the vibration of the seat face parts S1 to S4.

Figure 7:
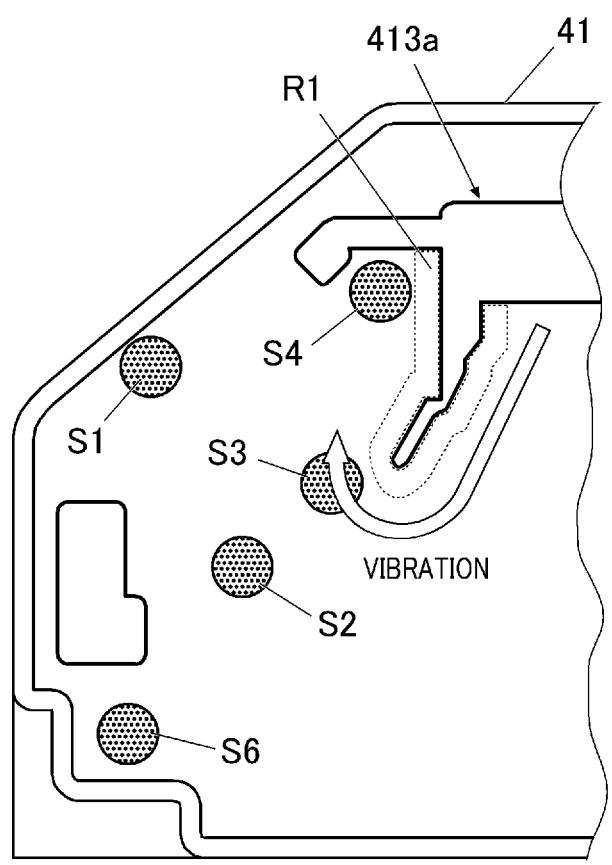
FIG. 7 is a schematic plan view of the housing having a rib connected to an opening.

FIG. 7 is a schematic plan view of the housing 41 having a rib R1 connected to the opening 413. The rib 415 disposed in the region AR1 including the seat face parts S1 to S4 of the housing 41 is not connected to the vibration antinodes A1 and A2 in the vicinity of the opening 413. This is because, as illustrated in FIG. 7, if the housing 41 has the rib R1 connected to the end of the long opening 413a contained in the vibration antinode A1, on the back surface of the bottom face part 411, vibration is transmitted from the vibration antinode A1 to the region AR1 including the seat face parts S1 to S4, via the rib R1.

Further, as illustrated in FIG. 4, the rib 415 is connected to the vibration antinode N1 and the wall 412. Therefore, the seat face parts S1 to S4 are supported by the vibration nodes N1 and the wall 412, so that the vibration of the seat face parts S1 to S4 is reduced by the vibration node N1 and the wall 412.

Figure 8A:
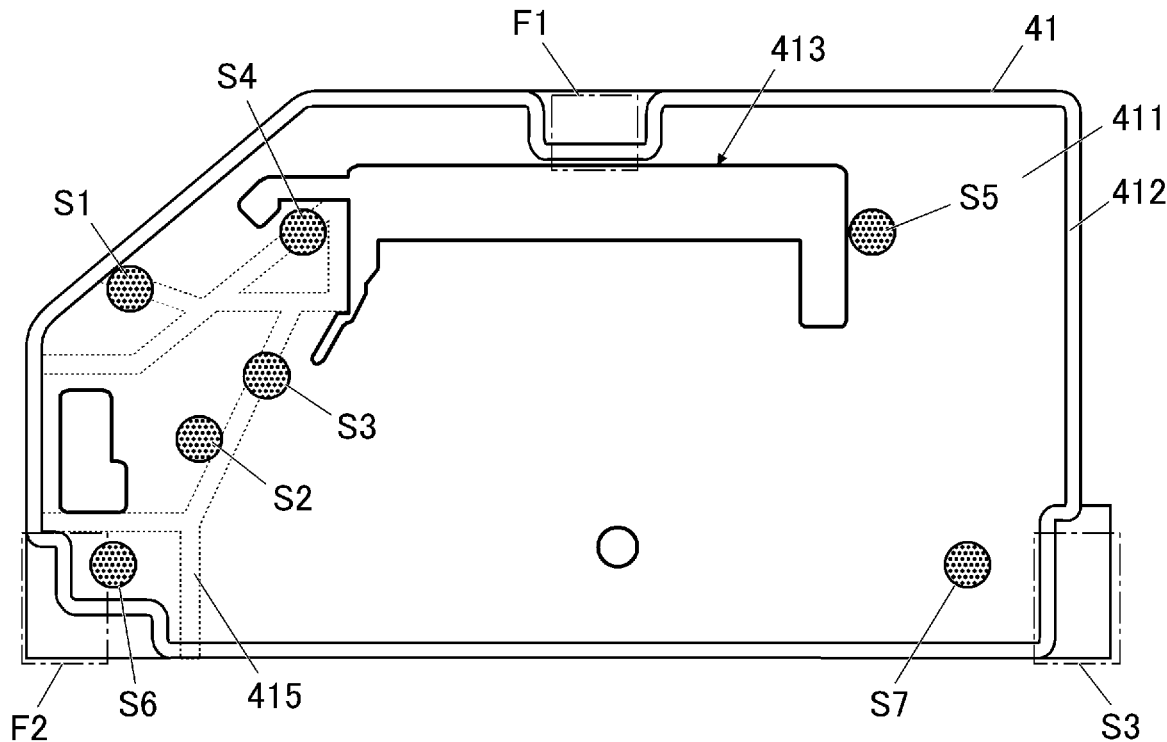
FIG. 8A is a schematic plan view illustrating fixing parts of the housing.
Figure 8B:
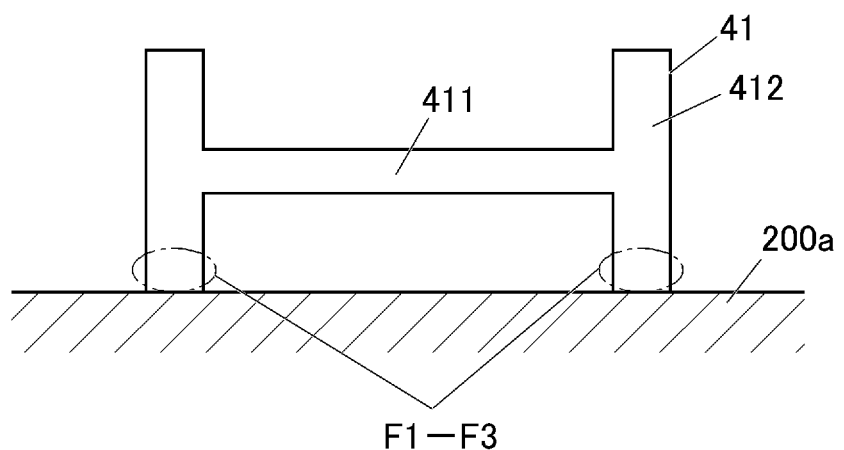
FIG. 8B is a schematic diagram illustrating the housing and a fixation part.

FIG. 8A is a schematic diagram illustrating fixing parts F1, F2, and F3 of the housing 41. FIG. 8A is a schematic diagram illustrating the housing 41 and a fixation part 200a. As illustrated in FIGS. 8A and 8B, a part of the main body unit 200 to which the exposer 2a is connected and fixed is the fixation part 200a. The fixing portions (fixing region) of the housing 41 fixed to the fixation part 200a are defined as the fixing parts F1, F2, and F3. The rib 415 is connected to the fixing portion F2. The seat face of the fixation part 200a of the image forming apparatus 1 has high rigidity so as to hold the housing 41. Therefore, the vibration of the seat face parts S1 to S4 can be further reduced by connecting the rib 415 to the fixing part F2.

Figure 9A:
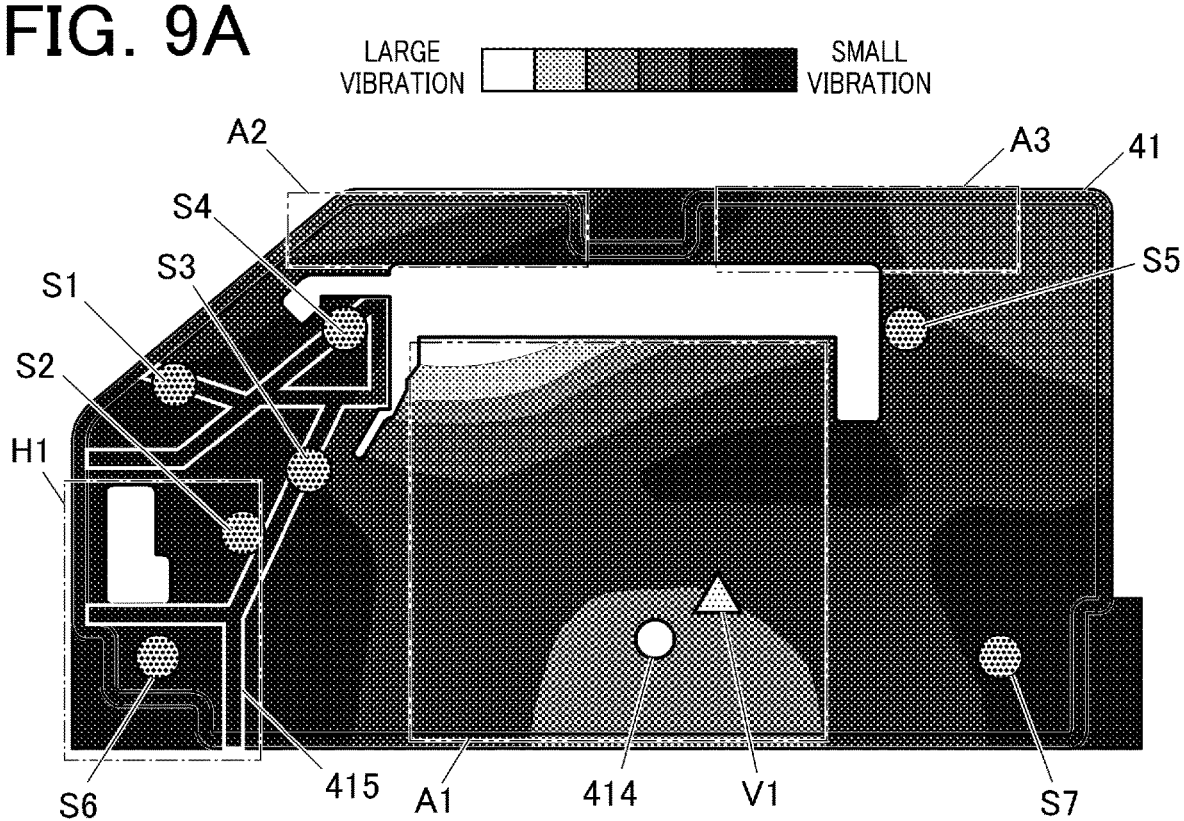
FIG. 9A illustrates the distribution of magnitude of the vibration of the housing according to the embodiment.
Figure 9B:
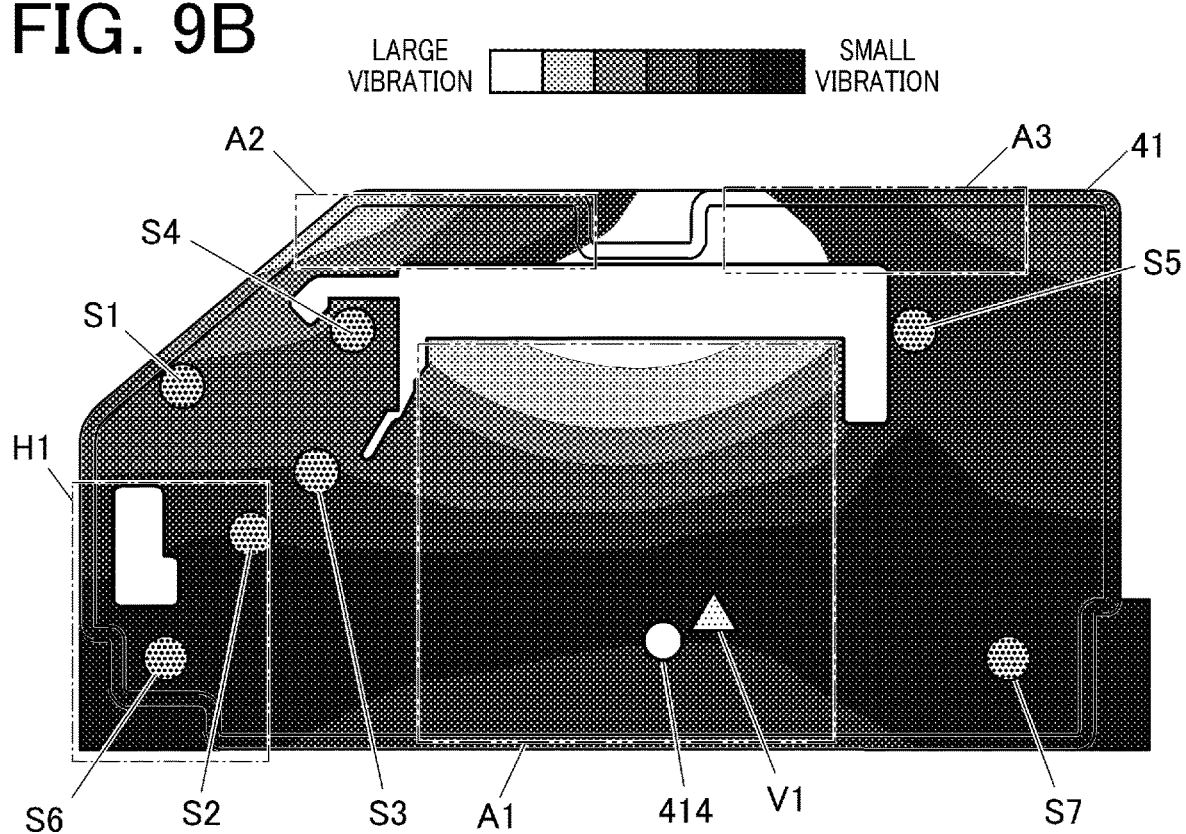
FIG. 9B illustrates the distribution of magnitude of the vibration of the housing in the case where the overall rigidity is increased.

In the following, the simulation results of the vibration of the exposer 2a will be described with reference to FIGS. 9A to 12. FIG. 9A illustrates the distribution of magnitude of the vibration of the housing 41 according to the present embodiment. FIG. 9B illustrates the distribution of magnitude of the vibration of the housing 41 in the case where the overall rigidity is increased.

As illustrated in FIG. 9A, vibration SIM (frequency response analysis) was performed on the housing 41 of the present embodiment, and the simulation results were obtained. The analysis conditions of the vibration SIM were as follows: An excitation force was applied to a portion in the vicinity of the arrangement position of the deflector 47 in the vertical direction in the drawings (sub direction) at an excitation frequency (single rotation frequency of 650 [Hz]) of the motor of the polygon mirror 471 generated from the deflector 47 during operation of the exposer 2a. The portion was defined as an excitation portion V1. The reason why the portion in the vicinity of the deflector 47 was selected as the excitation portion V1 is because the hole 414 is present in the arrangement position of the deflector 47 and an excitation force cannot be applied to the arrangement position of the deflector 47 in the simulation.

FIG. 9A is a contour diagram representing the magnitude of vibration in the sub direction by multiple gray levels where white corresponds to large vibration and black corresponds to small vibration. The same applies to FIG. 9B. FIG. 9B illustrates the simulation results of the case where a rigidity enhancer that increases the rigidity of the entire housing 41 is provided.

In the case of FIG. 9B where a rigidity enhancer that increases the rigidity of the entire housing 41 is provided, vibration is transmitted from the vibration antinodes A1 to A3 to the optical element seat face, so that the seat face parts S1 to S4 vibrate greatly. In this manner, if the rigidity of the entire housing 41 is increased, the vibration of the seat face parts S1 to S4 is increased even more.

Figure 10A:
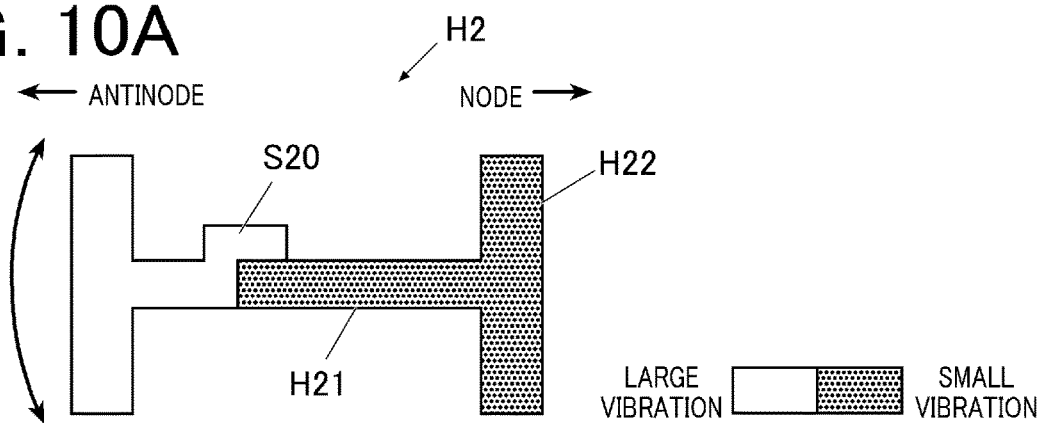
FIG. 10A is a schematic diagram of a housing without a rib.
Figure 10B:
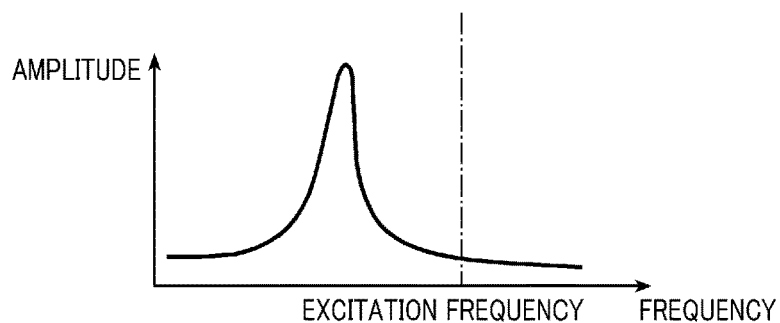
FIG. 10B illustrates the amplitude of the housing of FIG. 10A with respect to the frequency.
Figure 11A:
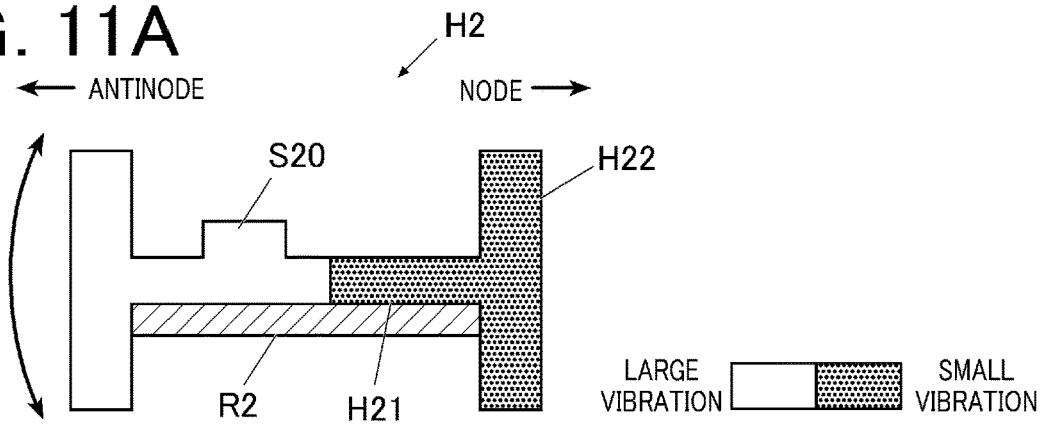
FIG. 11A is a schematic diagram of a housing with a rib.
Figure 11B:
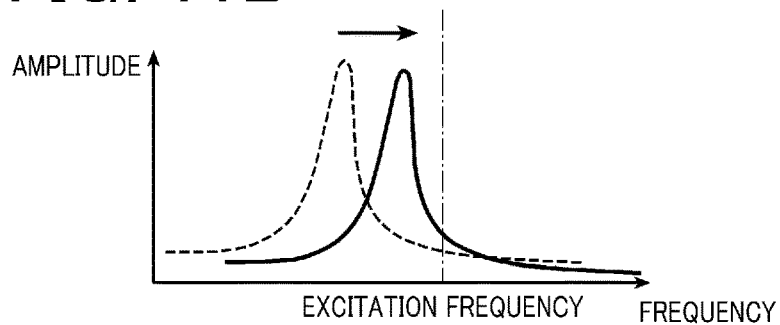
FIG. 11B illustrates the amplitude of the housing of FIG. 11A with respect to the frequency.

In the following, one cause of the increase in vibration in the case where the rigidity of the entire housing 41 is increased will be described with reference to FIGS. 10A to 11B. FIG. 10A is a schematic diagram of the housing H2 without a rib. FIG. 10B illustrates the amplitude of the housing H2 of FIG. 10A with respect to the frequency. FIG. 11A is a schematic diagram of the housing H2 with a rib R2. FIG. 11B illustrates the amplitude of the housing H2 of FIG. 11A with respect to the frequency.

The housing H2 illustrated in FIG. 10A does not have a rib on the bottom face part H21, and the vibration on the seat face part S20 is large. As illustrated in FIG. 10B, the amplitude of the housing H2 of FIG. 10A with respect to the frequency has a peak at the resonance point, and the resonance frequency is $(2\pi(k/m)^{1/2}$, k: rigidity, m: mass). The excitation frequency of the deflector and the resonance frequency are away by a predetermined frequency. The housing H2 of FIG. 11A has the rib R2 extending across the bottom face part H21. Therefore, as illustrated in FIG. 11B, at the amplitude of the housing H2 of FIG. 10A with respect to the frequency, the resonance frequency is increased and approaches the excitation frequency of the deflector, so that the amplitude at the seat face part S20 during excitation becomes greater than that of FIG. 10B.

In contrast, as illustrated in FIG. 9A, in the housing 41 having the opening 413 and the rib 415 according to the present invention, vibration from the vibration antinodes A1 to A3 to the seat face parts S1 to S4 is blocked, and the rigidity of the region AR1 including the seat face parts S1 to S4 is increased, while reducing the vibration of the seat face parts S1 to S4.

Figure 12:
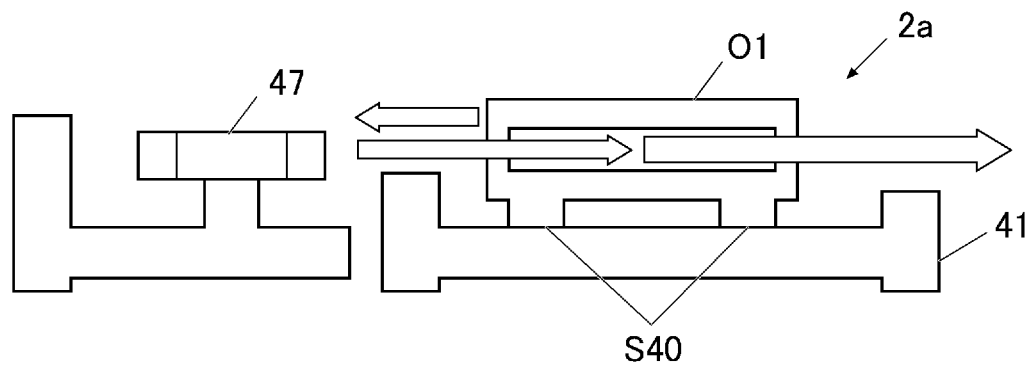
FIG. 12 is a schematic side view of the exposer according to the embodiment.

FIG. 12 is a schematic side view of the exposer 2a according to the present embodiment. FIG. 12 illustrates the direction of the light beam in the deflector 47, an optical element part O1, and the housing 41 of the exposer 2a of the present embodiment. The optical element part O1 includes the light source unit 42, and the optical element part including the collimator lens unit 43, the cylindrical lens unit 46, the folding mirror unit 49, and the long lens units 48 and 50. A seat face part S10 is a collection of the seat face parts S1 to S6. In the exposer 2a, since the vibration of the seat face part S10 is reduced due to the opening 413 and the rib 415, the vibration of the light beam in the sub direction on the imaging surface of the photoconductor 2b can be reduced, and a reduction in the image quality due to pitch irregularities can be prevented.

As described above, according to the present invention, the exposer 2a performs writing by scanning the image surface of the photoconductor 2b with light, the exposer 2a including: the light source part 42 including the light source that emits light; the deflector 47 that deflects and scans the light; the optical element part such as the collimator lens unit 43; and the housing 41 that holds the light source unit 42, the deflector 47, and the collimator lens unit 43; wherein the housing 41 includes: the notches 413b and 413c that isolate vibration transmitted from the vibration antinodes A1 to A3 where distribution of vibration in the sub direction is maximum to the seat face parts S1 to S4 for the light source part 42 and the collimator lens unit 43 having optical sensitivity in the sub direction, in the bottom face part 411; and the rib 415 that increases the rigidity of the seat face parts S1 to S4.

The image forming apparatus 1 includes the image former 20 that includes the exposer 2a and the photoconductor 2b, and that forms an image corresponding to the light emitted to the photoconductor 2b, on a sheet.

With this configuration, transmission of vibration from the vibration antinodes A1 to A3 to the light source unit 42 and the collimator lens unit 43 can be blocked without arranging the deflector 47 in a housing different from the housing of the light source unit 42 and the collimator lens unit 43 having optical sensitivity in the sub direction. Further, since a reduction in rigidity due to the notches 413b and 413c can be compensated for by providing the rib 415, a reduction in image quality due to vibration can be easily and effectively prevented.

Further, the housing 41 has the long opening 413a through which light passes, in the bottom face part 411. The vibration antinodes A1 to A3 are located near the long opening 413a. As the long opening 413a is provided, a portion of the bottom face part 411 in the vicinity of the long opening 413a has lower rigidity and tends to have a vibration node compared to the case where the long opening 413a is not provided, the optical elements in the vicinity of the long opening 413a are likely to be affected by the vibration antinode. Therefore, when the long opening 413a is provided in the bottom face part 411 having the notches 413b and 413c, the vibration of the collimator lens unit 43 in the vicinity of the long opening 413a can be more effectively reduced.

Further, the notches 413b and 413c are disposed between the vibration antinodes A1 to A3 and the seat face parts S1 to S4 on the bottom face part 411, and extend from the long opening 413a. Therefore, even when the vibration antinodes A1 to A3 and the seat face parts S1 to S4 are close to each other in the vicinity of the long opening 413a, transmission of vibration from the vibration antinodes A1 to A3 to the seat face parts S1 to S4 can be blocked.

Further, the seat face parts S1 to S4 are disposed on the inner side of the plurality of notches 413b and 413c. Therefore, even when the seat face parts S1 to S4 are disposed in the vicinity of the long opening 413a, and the plurality of vibration antinodes A1 to A3 are located in the vicinity of the long opening 413a, transmission of vibration from the vibration antinodes A1 to A3 to the seat face parts S1 to S4 can be blocked.

Further, on the bottom face part 411, the rib 415 is connected to a region on the side of the seat face parts S1 to S4 with respect to the notches 413b and 413c, and is not connected to a region on the side of the vibration antinodes A1 to A3 with respect to the notches 413b and 413c.

Therefore, transmission of vibration from the vibration antinodes A1 to A3 to the region on the side of the seat face parts S1 to S4 can be prevented. If the rib is connected to the region on the side of the vibration antinodes A1 to A3 with respect to the notches 413b and 413c, vibration is transmitted from the vibration antinodes A1 to A3 to the region on the side of the seat face parts S1 to S4 via the rib.

Further, the rib 415 is connected to the vibration node N1 where the distribution of vibration of the housing 41 is minimal Since the rib 415 is connected to the vibration node N1 with small vibration, the vibration of the seat face parts S1 to S4 can be further reduced.

Further, the rib 415 is connected to the wall 412 at the outer edge of the housing 41. Since the rib 415 is connected to the wall 412 with high rigidity, the vibration of the seat face parts S1 to S4 can be more effectively reduced.

Further, the rib 415 is connected to the fixing part F2 that fixes the housing 41 to the main body unit 200. Since the rib 415 is connected to the fixing part F2 of the housing 41 with small vibration, the vibration of the seat face parts S1 to S4 can be more effectively reduced.

Further, the rib 415 is integrally formed with the housing 41. Since the rib 415 is integrally formed, it is possible to avoid an increase in costs and eliminate the need for assembly time due to an additional part, compared to the case of attaching a separate member.

(First Modification)

Figure 13:
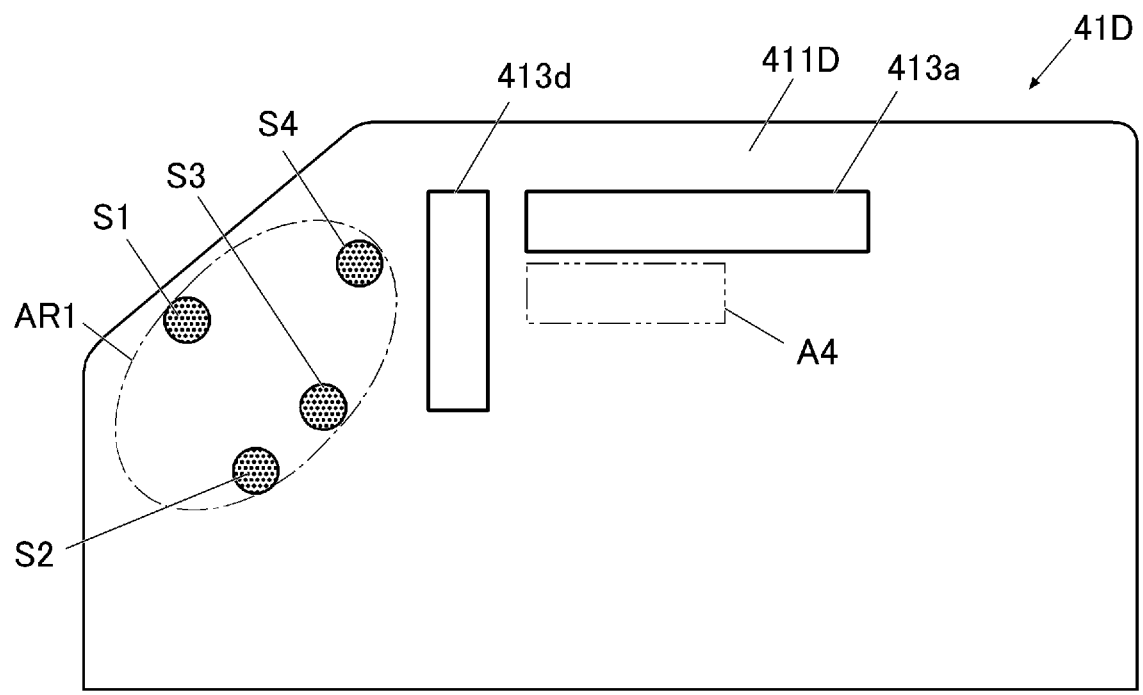
FIG. 13 is a schematic plan view of a housing according to a first modification.

A first modification of the above embodiment will be described with reference to FIG. 13. FIG. 13 is a schematic plan view of a housing 41D according to the present modification.

In the above embodiment, the notches 413b and 413c extending from the end of the long opening 413a serve as a vibration isolator of the housing 41. In the present modification, a hole provided as a through-hole independent of the long opening 413a serves as a vibration isolator. Specifically, as illustrated in FIG. 13, the housing 41D of the present modification has a hole 413d as a vibration isolator in a bottom face part 411D. In FIG. 13, only a vibration antinode A4 located on the center side with respect to the portion near the outer edge of the bottom face part 411D is illustrated as the vibration antinode. Even when the vibration antinode A4 is not located at the long opening 413a or the portion near the outer edge, transmission of vibration from the vibration antinode A4 to the region AR1 including the seat face parts S1 to S4 can be reduced by providing the hole 413d in the bottom face part 411D. In the case where the notches 413b and 413c are provided as in the above embodiment, there are restrictions on the design, requiring, for example, that the notches 413b and 413c must extend from the long opening 413a. In contrast, the hole 413d is independent of (not connected to) the long opening 413a, and therefore can be freely arranged in the bottom face part 411D. This is advantageous in that the design freedom is high.

As described above, according to the present modification, the housing 41D has the hole 413d disposed between the vibration antinode A4 and the seat face parts S1 to S4 on the bottom face part 411D. Therefore, compared to the case where the notches 413b and 413c of the above embodiment are provided, the design freedom of the exposer 2a can be increased. If a notch is provided, the notch needs to be connected to the outer edge of the housing or the long opening.

(Second Modification)

Figure 14:
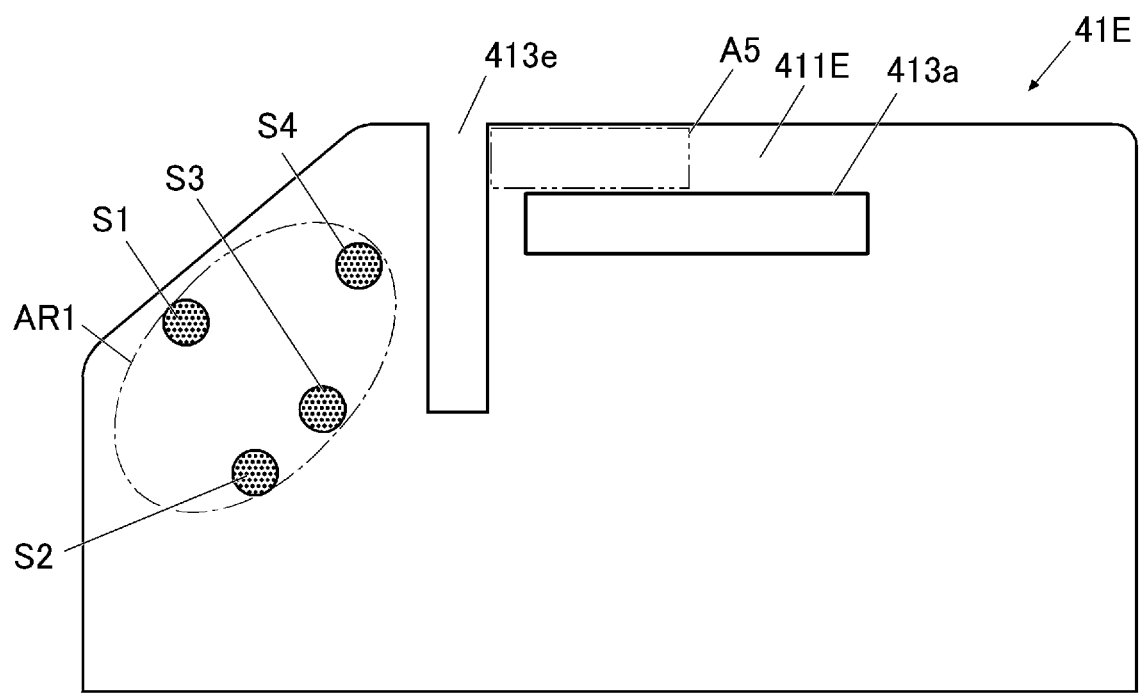
FIG. 14 is a schematic plan view of a housing according to a second modification.
Figure 15:
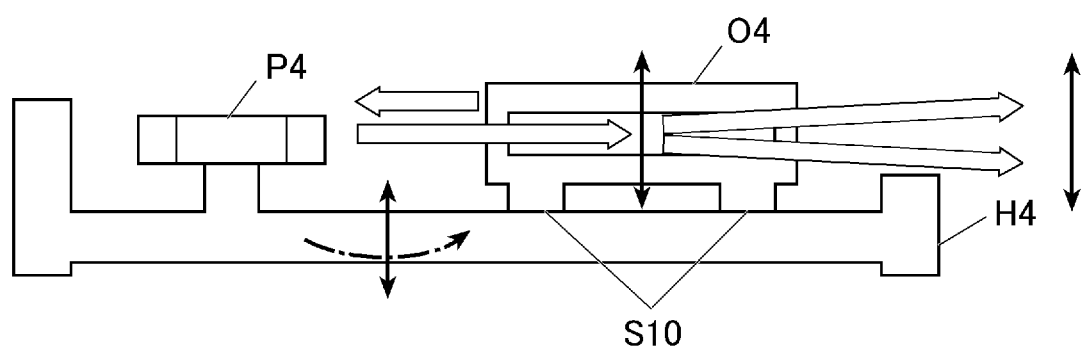
FIG. 15 is a schematic side view of a related-art optical writing device.

A second modification of the above embodiment will be described with reference to FIG. 14. FIG. 14 is a schematic plan view of a housing 41E according to the present modification.

In the above embodiment, the notches 413b and 413c extending from the end of the long opening 413a serve as a vibration isolator of the housing 41. In the present modification, a notch extending from the outer edge of the bottom face part serves as a vibration isolator. Specifically, as illustrated in FIG. 14, the housing 41E of the present modification has a notch 413e, as a vibration isolator and a second notch, in a bottom face part 411E. The notch 413e extends from the outer edge of the bottom face part 411E. In FIG. 14, only a vibration antinode A5 in the vicinity of the outer edge of the bottom face part 411E is illustrated as the vibration antinode.

According to the present modification described above, the housing 41E has the notch 413e disposed between the vibration antinode A5 and the seat face parts S1 to S4 on the bottom face part 411E, and extending from the outer edge of the bottom face part 411E. Therefore, even when the vibration antinode A5 is located in the vicinity of the outer edge of the bottom face part 411E, transmission of vibration from the vibration antinode A5 to the region AR1 including the seat face part S1 to S4 can be blocked by the notch 413e.

Note that the above embodiment and modifications are merely examples of the image forming apparatus according to a preferred embodiment of the present invention, and the present invention is not limited thereto.

For example, at least two of the above embodiment, the modifications, and the following configurations may be appropriately combined.

Further, the exposer may be disposed in a region including the vibration antinode on the bottom face part of the housing, and may include an optical element part that includes an optical element having almost no optical sensitivity in the sub direction of light (vibration direction). According to this configuration, since an optical element having no sensitivity in the sub direction is disposed at the vibration antinode where vibration is large, it is possible to effectively use the space in the housing while minimizing the effect on the image quality.

Further, in the above embodiment and modifications, the deflector 47 includes a polygon mirror. However, the present invention is not limited thereto. The deflector may include any other type of deflection unit such as a galvano mirror.

Further, in the above embodiment and modifications, a rib is provided on the bottom face part 411 as a rigidity enhancer. However, the present invention is not limited thereto. The rigidity enhancer may be a reinforcement member such as a metal sheet fixed to the bottom face part of the housing, or may be formed by locally increasing the thickness of the housing.

Further, in the above embodiment and modifications, a rib is provided on the back surface of the bottom face part 411 as a rigidity enhancer. However, the present invention is not limited thereto. The rigidity enhancer such as a rib may be arranged on either the front surface or the back surface of the bottom face part of the housing. The rigidity enhancer is a structure, such as a rib, that projects from the surface of the housing, and needs to be arranged so as not to interfere with the optical element or the light beam. However, since the rigidity enhancer may be arranged on either the front surface or the back surface as desired, the freedom in the arrangement of the optical element or the light beam is increased, making it possible to effectively use the space in the housing.

Although embodiments of the present invention have been described and illustrated in detail, the disclosed embodiments are made for purposes of illustration and example only and not limitation. The scope of the present invention should be interpreted by terms of the appended claims.

The detailed configuration and detailed operation of the components of the image forming apparatus 1 of the above embodiment may be appropriately modified without departing from the scope of the present invention.

What is claimed is:

1. An optical writing device that performs writing by scanning an image surface of a photoconductor with light, the optical writing device comprising:
    a light source unit including a light source that emits light;
    a deflection unit that deflects and scans the light;
    an optical element unit for the light; and
    a housing unit that holds the light source unit, the deflection unit, and the optical element unit;
    wherein the housing unit includes
    a vibration isolator that isolates vibration transmitted from a vibration antinode where distribution of vibration in a sub direction perpendicular to a scanning direction of the light on the image surface of the photoconductor is maximum to at least one of seat face parts for the light source unit and the optical element unit having optical sensitivity in the sub direction, in a bottom face part of the housing unit, and
    a rigidity enhancer that increases rigidity of the seat face part.

2. The optical writing device according to claim 1, wherein:
    the housing unit has an opening through which the light passes, in the bottom face part; and
    the vibration antinode is located near the opening.

3. The optical writing device according to claim 2, wherein the vibration isolator includes a first notch disposed between the vibration antinode and the seat face part on the bottom face part, and extending from the opening.

4. The optical writing device according to claim 3, wherein:
    the first notch is provided in plurality; and
    the seat face part is disposed on an inner side of the plurality of first notches.

5. The optical writing device according to claim 1, wherein the vibration isolator includes a hole disposed between the vibration antinode and the seat face part on the bottom face part.

6. The optical writing device according to claim 1, wherein the vibration isolator includes a second notch disposed between the vibration antinode and the seat face part, and extending from an outer edge of the bottom face part.

7. The optical writing device according to claim 1, wherein, on the bottom face part, the rigidity enhancer is connected to a region on a side of the seat face part with respect to the vibration isolator, and is not connected to a region on a side of the vibration antinode with respect to the vibration isolator.

8. The optical writing device according to claim 1, wherein the rigidity enhancer is connected to a vibration node where the distribution of vibration of the housing unit is minimal.

9. The optical writing device according to claim 1, wherein the rigidity enhancer is connected to a wall at an outer edge of the housing unit.

10. The optical writing device according to claim 1, wherein the rigidity enhancer is connected to a fixing part that fixes the housing unit to the image forming apparatus.

11. The optical writing device according to claim 1, wherein the optical element unit having no optical sensitivity in the sub direction is disposed in a region including the vibration antinode.

12. The optical writing device according to claim 1, wherein the rigidity enhancer is integrally formed with the housing unit.

13. An image forming apparatus comprising:
    an image forming unit that includes the optical writing device and the photoconductor of claim 1, and that forms an image corresponding to light emitted to the photoconductor, on a sheet.

* * * * *